(12) United States Patent
Khan et al.

(10) Patent No.: US 7,765,291 B1
(45) Date of Patent: Jul. 27, 2010

(54) BUSINESS PROCESS MANAGEMENT/WORKFLOW AUTOMATION SOFTWARE

(75) Inventors: Rashid N. Khan, Cary, NC (US); Michael J. Andrade, Raleigh, NC (US)

(73) Assignee: Ultimus, Inc., Cary, NC (US)

( * ) Notice: Subject to any disclaimer, the term of this patent is extended or adjusted under 35 U.S.C. 154(b) by 1834 days.

(21) Appl. No.: 10/848,627

(22) Filed: May 19, 2004

(51) Int. Cl. *G06F 15/16* (2006.01)
(52) U.S. Cl. .............. 709/224; 709/223; 709/203; 705/7; 705/8; 705/9
(58) Field of Classification Search ............ 705/7–9; 709/203, 223–224
See application file for complete search history.

(56) References Cited

U.S. PATENT DOCUMENTS

| | | | |
|---|---|---|---|
| 5,930,512 A * | 7/1999 | Boden et al. | 717/102 |
| 6,073,109 A * | 6/2000 | Flores et al. | 705/8 |
| 6,157,934 A | 12/2000 | Khan et al. | 715/503 |
| 6,308,224 B1 | 10/2001 | Leymann et al. | 709/310 |
| 6,401,073 B1 * | 6/2002 | Tokuda et al. | 705/8 |
| 6,466,956 B1 | 10/2002 | Cho et al. | |
| 6,546,364 B1 | 4/2003 | Smirnov et al. | 703/22 |
| 6,618,730 B1 * | 9/2003 | Poulter et al. | 707/102 |
| 6,631,354 B1 * | 10/2003 | Leymann et al. | 705/8 |
| 6,662,355 B1 * | 12/2003 | Caswell et al. | 717/103 |
| 6,817,008 B2 * | 11/2004 | Ledford et al. | 717/102 |
| 7,131,071 B2 * | 10/2006 | Gune et al. | 715/769 |
| 7,275,039 B2 * | 9/2007 | Setteducati | 705/8 |
| 7,296,058 B2 * | 11/2007 | Throop | 709/206 |
| 7,308,702 B1 * | 12/2007 | Thomsen et al. | 726/1 |
| 7,403,948 B2 * | 7/2008 | Ghoneimy et al. | 1/1 |
| 7,448,046 B2 * | 11/2008 | Navani et al. | 719/316 |
| 7,503,032 B2 * | 3/2009 | Bhaskaran et al. | 717/104 |
| 7,533,008 B2 * | 5/2009 | Mangino et al. | 703/6 |
| 7,610,211 B2 * | 10/2009 | Casati et al. | 705/7 |
| 7,653,562 B2 * | 1/2010 | Schulz et al. | 705/7 |
| 7,657,590 B2 * | 2/2010 | Reading et al. | 709/201 |
| 2002/0010741 A1 | 1/2002 | Stewart et al. | 709/204 |
| 2002/0052769 A1 * | 5/2002 | Navani et al. | 705/7 |
| 2002/0169752 A1 | 11/2002 | Kusama et al. | 707/1 |
| 2003/0023622 A1 * | 1/2003 | Obermeyer et al. | 707/500 |
| 2003/0078820 A1 * | 4/2003 | Ouchi | 705/7 |
| 2003/0083910 A1 * | 5/2003 | Sayal et al. | 705/7 |
| 2003/0195762 A1 * | 10/2003 | Gleason et al. | 705/1 |
| 2003/0233249 A1 | 12/2003 | Walsh et al. | 705/1 |
| 2004/0078105 A1 * | 4/2004 | Moon et al. | 700/100 |
| 2004/0162741 A1 * | 8/2004 | Flaxer et al. | 705/7 |
| 2004/0260667 A1 * | 12/2004 | Huelsman et al. | 706/47 |

(Continued)

OTHER PUBLICATIONS

Ultimus Profit from the Process and website printouts; undated, admitted prior art, printed Jul. 6, 2004.

*Primary Examiner*—Alina N. Boutah
(74) *Attorney, Agent, or Firm*—MacCord Mason PLLC (57) ABSTRACT

A business process management/workflow automation system includes a network of computers equipped with software that permits a business process that includes a plurality of tasks to proceed across the network based upon stored rules. Upon the completion of a task, the network looks for a subsequent rule until process completion or a condition of unruliness, at which event a process owner is prompted to add a rule. A rules repository stores previously made rules and rules made by a process owner as the process proceeds, for reuse when the process with the refined rule runs again.

1 Claim, 4 Drawing Sheets

U.S. PATENT DOCUMENTS

2005/0005259 A1* 1/2005 Avery et al. .................. 717/103
2005/0027585 A1* 2/2005 Wodtke et al. .................. 705/9
2005/0096959 A1* 5/2005 Kumar et al. .................. 705/8

* cited by examiner

BUSINESS PROCESS MANAGEMENT/WORKFLOW AUTOMATION SOFTWARE

BACKGROUND OF THE INVENTION

Workflow automation software is known, as exemplified by existing U.S. Pat. No. 6,157,934 and the commercial product known as Ultimus Workflow Suite, a product of Ultimus, Inc., the assignee of this application. The entire disclosure of that patent is hereby incorporated herein by reference. The current state-of-the-art in the business process management/workflow automation (BPM/WFA) software is to represent business processes as graphical flowcharts also called "process maps" or "workflow maps."

A business process (also called simply a "process") is defined as: "A sequence of structured or semi-structured tasks that are performed in series or in parallel by two or more individuals or application to reach a common goal." The highlighted words signify the five essential elements of a business process:

i. A process is a "sequence" of tasks indicating the plurality of things that must be accomplished. One task alone does not constitute a process.

ii. The sequence of tasks is "structured or semi-structured." This signifies that there is some logic to a process. The tasks are not performed on a purely ad hoc basis.

iii. Tasks can be performed in "series or in parallel" based upon the logic of the business process.

iv. There must be at least "two or more" individuals or applications involved as players performing different tasks. If one individual uses an application or form to enter information into a database, that does not constitute a process. Work must flow from one individual or application to another individual or application.

v. The sequence of tasks must have a purpose of reaching a common goal or outcome. This emphasizes the fact that process is geared towards producing results. Merely linking together unrelated tasks into a series of steps does not make a business process.

Figure 1:
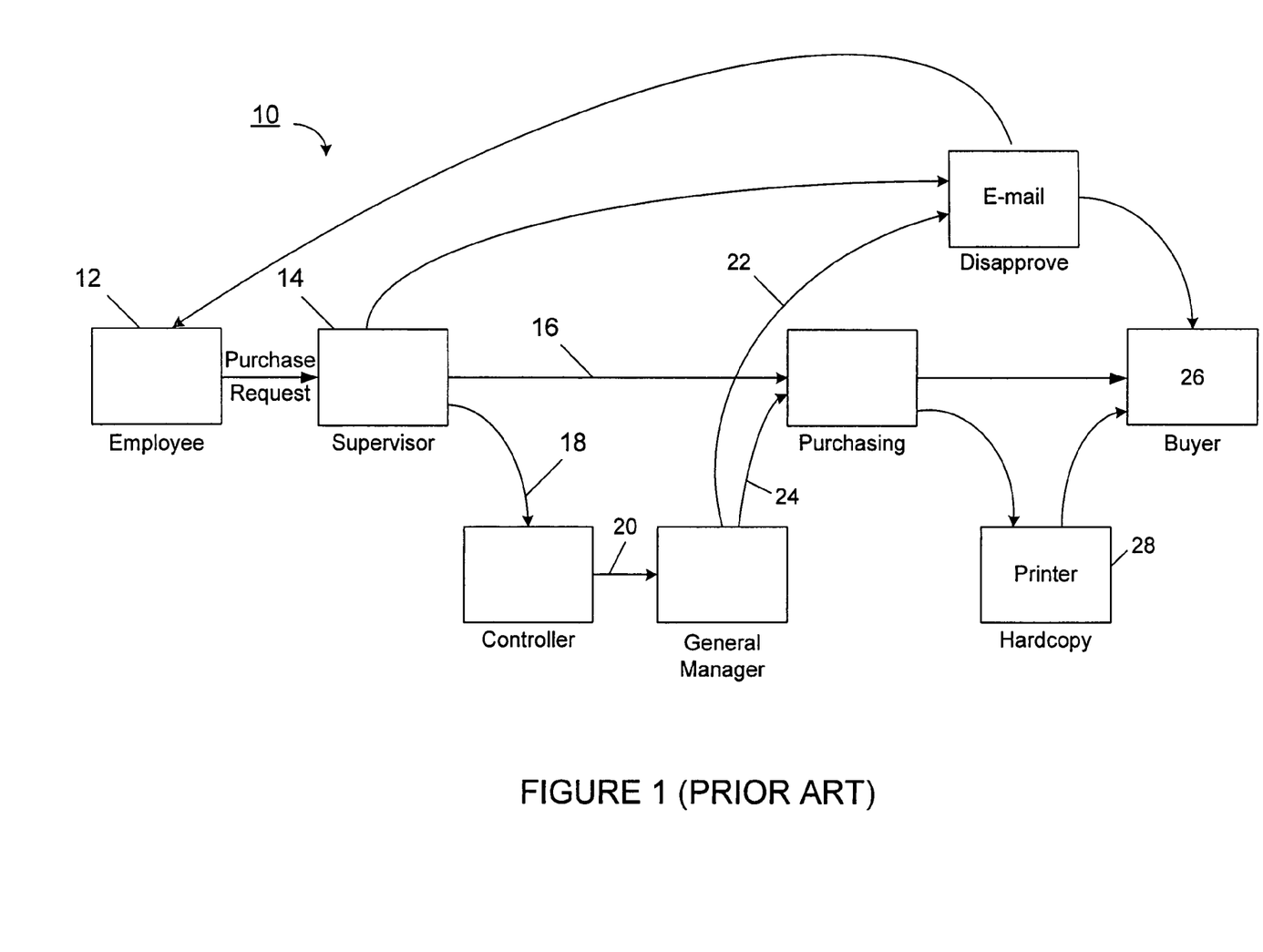
FIG. 1 is a simple "prior art" process map.

FIG. 1 is a block diagram of a process 10 for a simple purchase requisition process. While many of the tasks of FIG. 1 can be accomplished with old fashioned paper and "sneaker-net" routing, modern workflow automation uses a network of computers, and electronic forms. In this example, any employee 12 can initiate a purchase requisition by filling out a form. This is the first step, or task, that must be performed. The supervisor 14 of the employee must then approve the purchase requisition, as represented by the second step in the process. If the supervisor disapproves the purchase, then an e-mail message is sent to the employee informing him of the reasons. If the supervisor approves the purchase, and the amount is less than $1000, the purchase order is sent (step 16) to the buyer 25 since the supervisor is allowed to approve items costing up to $1000. If the amount is more than $1000, the purchase order is sent (step 18) to the company controller, who checks for funds availability and makes a recommendation. It is then sent (20) to the general manager of the company who can approve or disapprove the purchase. Again, if the general manger disapproves it 22, an e-mail is sent to the employee who requested the purchase. If the general manager approves 24, the purchase order is routed to the buyer 25. The buyer can either place an order via telephone and the process ends 26, or she can print 28 a hard copy and mail it to the supplier.

This simple example illustrates the essential elements of a process:

i. The purchase requisition process is a "sequence" of tasks, such as the initial request, supervisor approval, e-mail notification, general manager approval and purchasing. Each step in the process represents a discrete task.

ii. The sequence of tasks is "structured or semi-structured." The tasks are carried out in accordance with certain logic or rules. For example:
  a. The initial request must always be approved by the initiator's supervisor
  b. If the amount is more than $1000, the general manager must approve it.
  c. If the request is denied, the requestor must be notified via e-mail.

iii. The tasks can be performed in "series or in parallel" based upon the logic of the business process. In this example the e-mail notification is sent in parallel, or at the same time the buyer is requested to place the order.

iv. There must be at least "two or more" individuals involved as participants performing different tasks. There are several people involved in the purchase requisition process, including the employee, supervisor, buyer, general manager and controller. In this example we also have two applications involved, namely e-mail and a word processing program, such as Microsoft Word.

v. The sequence of tasks must have a purpose of reaching a common goal or outcome. In this example the purpose of the workflow is to either approve and buy the requested item, or deny it and inform the requestor of the reasons it was denied.

Based on the definition and this simple example, one can think of many other examples of business processes in every company or organization that fall in the business process category. Some of them are listed in Table 1, but the number and type of processes vary from organization to organization. Suffice it to say that there are a large number of processes, and every organization has its own flavor of each.

TABLE 1

Some Typical Workflow Processes

| | |
|---|---|
| Order Processing and Fulfillment | Change Orders |
| Performance Reviews | Purchase Requisitions |
| Capital Appropriations | New Hire Processing |
| Defect Tracking and Resolution | New Product Development |
| Document Approval Routing | Leads Management |
| Medical/Insurance Claims | Customer Care Processes |
| Expense Reports | Return Material Authorizations |
| Warranty Management | Invoice Processing |
| Employee Self-Service Processes | Correspondence Tracking |

Conventional state-of-the-art BPM/WFA systems are used to automate such business processes using software. The problems with the current approach for automation are as follows:

1. Defining Process Maps: Before a process can be automated, a person or team with a very good knowledge of the business process has to spend a considerable amount of time documenting the current business processes and creating the "flowchart" or process maps. All possible paths or "flows" have to be discovered and included. This effort is very labor intensive, and the time and cost of this effort increases with the complexity of the process. Furthermore, this effort typically requires the use of a business analyst or equivalent, which is an expensive resource. Once the analysts are finished, the process map has to be converted in to a deployable application, which also requires expensive IT personnel.

2. Defining Recipients: The person who performs the task at a step is called the "recipient" or "role". In addition to the time and cost of laying out the process map, the process designers have to discover and specify who will perform each step in the process. The recipient could be determined by a number of factors:
   i. A specific user performs a task. (E.g. John completes the "supervisor" step)
   ii. A specific job function performs a task (E.g. The "CEO" completes the "general manager" step)
   iii. A recipient is determined by a reporting relationship (E.g. the "supervisor" step is completed by the person who is the supervisor of the person who started the request)
   iv. A group is the recipient of a task (E.g. all the quality mangers must review a document)
   v. A recipient is determined dynamically (E.g. the recipient is based upon an "account number" which is entered by a user at a step in the process"
   vi. A recipient is based on skill levels (E.g. if the purchase amount is more than $10,000 the purchase is made by John, else it is made by Jane)
   vii. A recipient is based on availability (E.g. the buyer step can be performed either by John or Jane, whoever is first available)
   viii. A recipient is based on who has the least amount of workload. (E.g. the buyer step is performed by finding out which buyer has the least amount of work to do.)

Deciding who the recipient is for each step of the process is also a time consuming activity that has to be performed before the process can be activated and is usually performed by a business analyst.

3. Defining Business Rules: In addition to defining the process map and the recipients of each step, it is also important to specify the business rules associated with each step that are to be followed whenever an event occurs. In the example of FIG. 1 described above, a rule is that if the purchase order amount is more than $1000, it must be approved by the general manager, but if it is less the approval of the general manager is not required. The rules tell the software what to do. These rules are generally associated with events that occur for each step. For example, rule described above is evaluated when the event "Supervisor step is complete" occurs. The rules can be conditional or unconditional. All these rules have to be specified for each step in the process. One can imagine that for other than very simple processes, the time, cost and effort required to discover and document all these rules is significant. Furthermore, if the goal is to fully automate these processes, even those events that occur very infrequently require that their rules be specified upfront. Otherwise, if such an event occurs, the automated process will fail.

4. Accommodating Change: Finally, business process maps and their associated rules and recipients are subject to frequent change, as the conditions and the environment of an organization changes. Thus, even after a business process has been automated, the process map, the recipient and the rules frequently have to be changed. These changes involve business analysts as well as technical IT people, since the former knows the process and the latter knows the automation of processes. As shown, the rigidity of prior systems pose problems that limit their usefulness.

SUMMARY OF THE INVENTION

The present invention overcomes one or more of these problems in the art by providing a workflow automation system including a network of computers equipped with workflow automation software to permit a business process to proceed across at least portions of the network based upon rules stored in the network, wherein the software permits a process owner to refine the rules for a process as the process proceeds. As used herein "workflow automation" is meant to include "business process automation", and vice versa.

Typically, refinements of the rules are stored in the network for reuse when the process with the refined rule runs again. Preferably, the network includes a rules repository for storing previously made rules and for receiving and storing rules made by a process owner as the process proceeds. Once started, a process usually runs until completion unless a condition of unruliness occurs, at which event the process owner is prompted to add a rule for the process.

Processes typically include a plurality of tasks, and upon the completion of a task, the network looks for a subsequent rule for the process. In some cases upon the completion of a task, the network looks for a subsequent link in a pre-established flow path for the process.

In a preferred embodiment the network includes an event-driven BPM/WFA server that controls the execution of business processes. Typically, it is connected to a business rules engine.

The business process may include a plurality of events and for each event the system may ascertain if a rule is true for the conditions involved and, if true, execute an action associated with the rule. If no rule is true, the software may ascertain if a link in a process flow path is true, and, if true, execute an action associated with the link.

In preferred embodiments, the software includes a process owner's client software that enables the process owner to perform the following functions:
   i. View the list of all UnRuly Events for which there are no true rules and no links, this list of UnRuly Events is generated as needed when processes are executed. There is no a priori need for defining all the rules and the links in the process map.
   ii. View a process map of an incident associated with an UnRuly Event to graphically determine the incident's status,
   iii. View an audit trail of the incident associated with the UnRuly Event to determine where the incident is in a process,
   iv. View a reason why the UnRuly Event was triggered,
   v. View an electronic form for the incident to find relevant information,
   vi. View variables collected by the process and their current values,
   vii. View the rules, inputs and actions for any step of the process associated with the UnRuly Event,
   viii. Set or change a rule for the UnRuly Event,
   ix. Set or change an input for a rule for the UnRuly Event.
   x. Set or change an action associated with the rule for the UnRuly Event,
   xi. Enter or edit a description of the rule,
   xii. Submit the UnRuly Event for re-evaluation, xiii. View the events, inputs and actions of all the rules for all processes for which the process owner has access rights, xiv. Enter or edit the events, inputs and actions of all the rules for all processes for which the process owner has access rights, xv. View the events, inputs and actions of all the process level or global rules for which the process owner has access rights, and xvi. Enter or edit the events, inputs and actions of all the process level or global rules for which the process owner has access rights.

The invention may also be considered as an apparatus for business process management/workflow automation (BPM/WFA) including a server computer with memory; a plurality of client computers each having an electronic coupling to the server computer for transmission of information between the server computer and each of the client computers; a rules processor in electronic communication with the server for processing workflow rules; and a rules repository in electronic communication with the rules processor for storing workflow rules.

Such an apparatus may include an administrator software program for administering the server computer. It may also include a designer software program for defining the steps of the business process.

Typically, the rules processor is capable of processing rules that are specific for a particular task event. In some embodiments the rules processor processes rules that are common to a complete process (process rules), and can be used in any process for any task event In addition Global rules can be used in any process for any event; and Eventrules can be used only for a specific Event.

The apparatus may be capable of automatically discovering the identity of task recipients needed for future implementations of the process. The apparatus may include a means for a user (usually a process owner) to specify or dynamically change recipient identifiers for any previously identified recipients.

It may also include means by which a user can enter or dynamically edit existing business rules.

The invention can also be considered as a method of workflow automation including providing a server computer and a plurality of client computers each having an electronic coupling to the server computer for transmission of information between the server computer and each of the client computers; providing a rules repository having an electronic coupling to a rules processor having an electronic coupling to the server computer for retrieval and processing of rules associated with a workflow process; defining a set of tasks that must be completed in order for the workflow to be completed; identifying an individual or a group of individuals who are process owners having knowledge, or who can find the knowledge to define the flow of the process, the rules for the repository and the recipients of the tasks; and invoking the server computer to act as an event-driven controller to control the flow of the process from start to completion.

The server typically determines if there are any rules in the rules repository that are defined for a given event, and if so evaluates the rules and takes action associated with any rules that are true. In another embodiment the server determines if there are any rules in the rules repository that are defined for a given event, and if not, or if none of the rules are true, then the server determines if there are any explicit links that will direct the server as to how to proceed. If the server determines that there are no rules or links for a given event, it responds by sending a request to the process owner requesting a new rule definition. Preferably, the new rule provided by the process owner is stored in the rules repository for future use.

The rules stored in the rules repository may include conditional and unconditional rules based upon real-time values handled by the rules processor. The server may act as an event-driven controller to control the flow of the workflow process from start to completion.

In some embodiments a task recipient can disown the task.

Preferably the rules of the process are available for use from the rules repository as task events become recurrent.

The invention also may be regarded as a software product for workflow automation including an electronic storage medium holding electronic information which, when loaded on a server computer and a plurality of client computers electronically coupled to the server causes the server and client computer to be configured for a workflow process wherein the server computer has access to a rules repository having rules defined for specific tasks associated with the workflow process.

The software may include server computer instructions making up a rules processor for processing the rules stored in the rules repository. The software may include a plurality of client computer instructions for allowing a process owner to view the status of the process on the server computer. The client computer instructions may present a graphical representation of the process. The software may include a plurality of client computer instructions to allow a process owner to edit rules stored within the rules repository.

The invention may also be considered as a method of business process management including providing a network of computers and a business process control program so that a plurality of participants in a business process can interact with one another concerning the business process over the network, establishing a business process on the network made up of a plurality of tasks to be performed by the participants according to rules defined for the process, and providing a business process owner with means on the network to alter or add rules for processes that the business process owner owns.

The method preferably includes notifying a business process owner that a process owned by that business process owner has become unruly and enabling the business process owner to add or modify a rule for the unruly process.

The software of the present invention can be used with pre-existing workflow process maps, and the methodology and know how associated with such pre-existing workflow process maps, their creation and implementation are known to those of ordinary skill in the art. The present invention can be provided as an upgrade to software for such functionality or as a new product having such functionality to which the features described herein below are added and/or integrated.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 2:
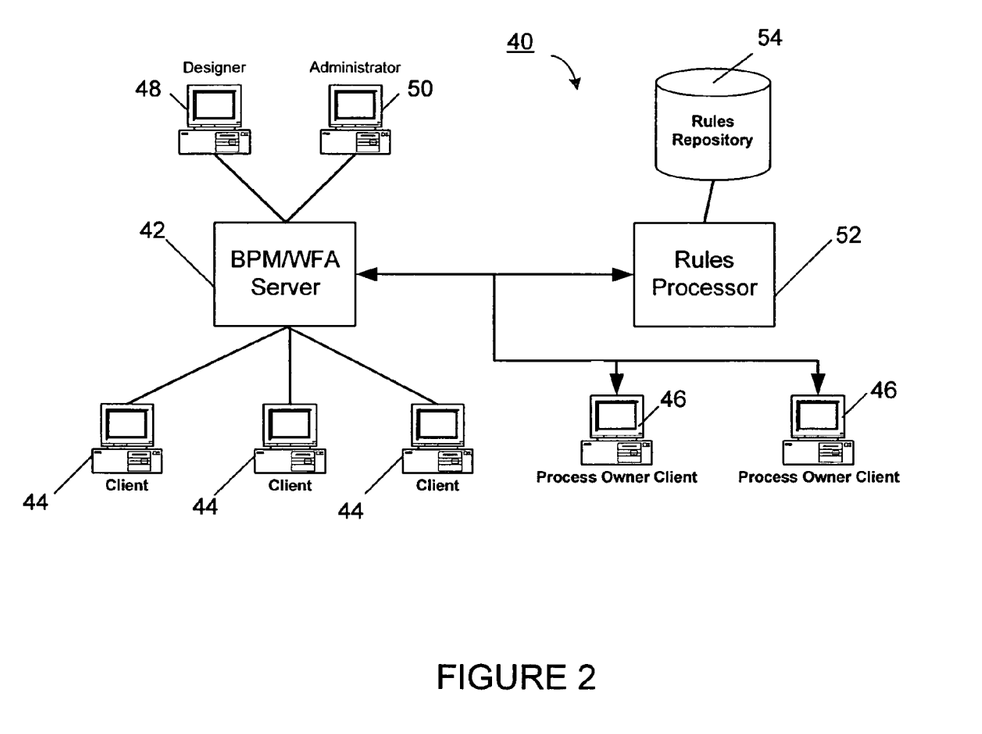
FIG. 2 is a BPM/WFA server based system according to the present invention.

As seen in FIG. 2, an apparatus 40 and method for business process management and/or workflow automation is provided and referred to as a BPM/WFA system. The apparatus includes a BPM/WFA server computer 42 that is networked with a plurality of client computers 44. At least one of the client computers is designated as a "process owner" client 46. The process owner client enables its user, called the process owner, to perform various functions, such as view a list of unruly events, set or change rules for unruly events and to edit or enter task events.

Two other computers connected to the server network are designated "Designer" and "Administrator". The "Designer" computer 48 is tasked with defining the steps of the business process, while the "Administrator" 50 is used to administer the BPM/WFA server.

A rules processor 52 having a rules repository 54 is also networked to the BPM/WFA server 42. Whenever a task event occurs, the rules processor 52 searches the rules repository 54 for an applicable rule. If an applicable rule is found, the rules processor 52 executes actions associated with the rule.

In operation, a user defines a task list that the BPM/WFA system uses to "discover" a process workflow during the execution of each task from the task list. The system also "discovers" the recipients of any outputs from an executed task. Moreover, the system "discovers" rules for handling tasks. It does so by looking for rules or links associated with a task event and then by executing actions specified by the rule or link. If no rules or links are found, the BPM/WFA server declares the task event "unruly" and a message is sent to a process owner requesting that a rule be established for the "unruly" event. In either case, the system deposits new rules into the rules repository for future use, thus improving the speed and efficiency of the system. The above features do away with the need for a pre-constructed workflow map, thereby reducing the need for the IT personnel normally required to set up business process management systems, as in implementations of prior U.S. Pat. No. 6,157,934.

There is no need to define business process maps. The user can simply define a list of the tasks that must be completed. The system will then "discover" its map during the execution of each case, and remembers it for future use. However, if some or all parts of the process map are known in advance, the user can always define the "map" (including links) to the extent known, but still be able to change or add to it dynamically.

There is no need to specify the recipient of each step. The system will "discover" the recipient of each step when needed, and will remember the recipient for future use. However, if some or all the recipients are known in advance, the user can specify them, but still be able to change them dynamically.

There is no need to discover and specify the business rules for all the steps and each of the events. The system will "discover" the rules when there is a need to know the rules, and remember them for future use. However, if some or all the rules are known upfront, the user can specify them in advance and can change them dynamically. The "discoveries" of the map links, recipients and/or rules occurs when an unruly event arises, permitting the process owner to devise these attributes in as the situation (which may have been unexpected) is known.

If the flow or the recipients of business rules change, there is no need to change the process map. Typically, the definitions and changes can be made by business owners/analysts without requiring the need for IT people. Those who own the processes can actually make the definitions and the changes.

The process map, rules, and recipients do not need to be fully discovered before the process can be automated. This takes a long time, and in many cases much of this information may not even be needed for most situations. It may be needed only for exceptions that occur rarely. In addition, everything that is "discovered" is remembered for future use. So, as the invention is used more and more, it requires less and less discovery.

In one embodiment the process operates as follows:
1. There is no need for the a priori definition of process map, recipients and rules. The user only needs to define the set of tasks (or steps) that must be completed in order for the process to be completed. There is no need to define the order of the tasks, the rules associated with each, or their recipients.
2. A "process owner" is identified for each process. The process owner is an individual or a group of individuals who has the knowledge or can find the knowledge to define the flow of the process, the business rules and the recipients.
3. The process automation is controlled by an event-driven "controller" called a BPM/WFA server 42. This server controls the flow of the process from start to completion. It is called "event-driven" because it takes new action when an event is completed. In conventional BPM/WFA servers, the occurrence of events causes the server to determine what to do next, based on the a priori definition of the process map, recipients and business rules.
4. The BPM/WFA server is driven by the following Events:
    i. "completion of a step"
    ii. "activation of step"
    iii. "step is returned"
    iv. "step is resubmitted"
    v. "step becomes late"
    vi. "step has no recipient".
    vii. "step is disowned" which means that the user who was the recipient claims that he/she cannot do the task because (a) it is not his to do and was assigned to him by mistake (b) he/she does not have the skills to do it.
5. When an event occurs, the behavior of the BPM/WFA server is dictated by the flowchart shown in FIG. 3. The BPM/WFA server determines if there are rules that are defined for that event. If that is the case, the BPM/WFA server simply evaluates the rules and takes the action associated with rules that are true. If there are no rules, or if none of the rules are true, the BPM/WFA server determines if there are any pre-defined links (i.e. links created in an a priori map) in the map that will tell it what to do. A link differs from a rule in being unconditional—it specifies a next step to operate; a rule provides options for actions, depending on the evaluation of variables known to the system. If there is a link, the server simply follows the link and invokes the actions specified by the link. However, if there are no rules that are satisfied and no links, the event is declared 'UnRuly' and the BPM/WFA server sends a request to the "process owner" to provide rules to handle it.
6. The "process owner" is provided information about the UnRuly Event that triggered the request and other relevent information about the case. The "process owner" can then add or edit one or more rules that will dictate what should happen for the event in the given conditions. The rules can be unconditional or conditional based upon real-time values handled by the process.

Figure 3:
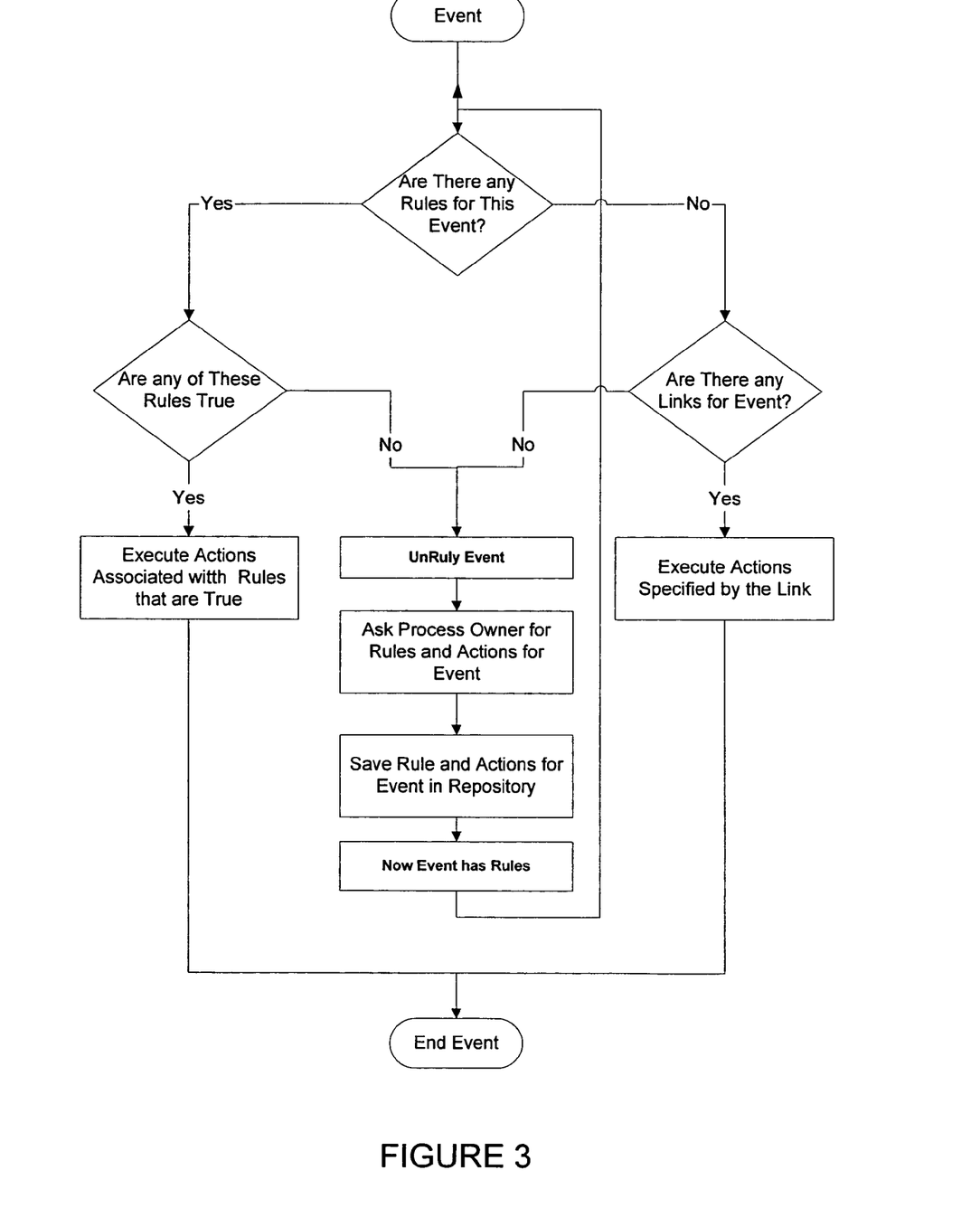
FIG. 3 is a flowchart depicting Event behavior.
Figure 4:
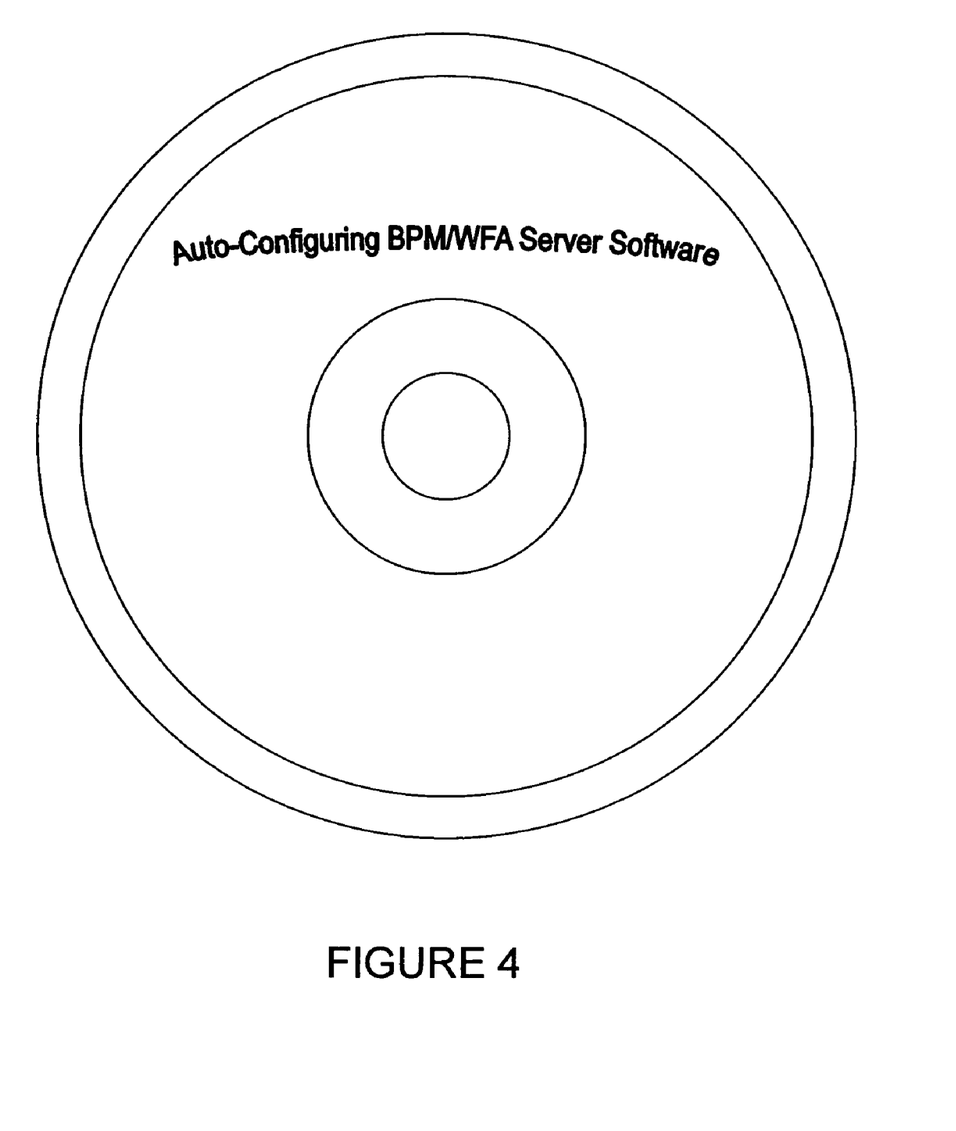
FIG. 4 depicts an electronic storage medium for holding software for loading onto the BPM/WFA server system of FIG. 2.

There are at least six categories of rules that are typical in the software in order to fully describe a process:
  i. Activate: These rules specify the conditions under which a step is to be activated.
  ii. Complete: These rules specify what happens when a step is completed.
  iii. Late: These rules specify what happens if a step is late.
  iv. Return: These rules specify what happens if a step is returned for lack of proper information or some other reason.
  v. Resubmit: These rules specify what happens if a step is resubmitted if new information becomes available.
  vi. Recipient: These rules specify who the recipient of the step will be under various conditions
7. The rules entered by the process owner are saved in a rules repository 54 for future use. If the same event occurs again, the rules defining the behavior of the process will already be in the rules repository. Therefore as the system is used more and more, there will be fewer and fewer UnRuly Events that will require intervention from the process owner.
8. Once the rules have been entered for the event, the case is resubmitted to the BPM/WFA server 42. It will now know what to do for the event and will proceed accordingly.
9. This invention does not require the a priori definition of process maps, business rules and recipients. However, if some or all of this information is known in advance for some or all the events or steps, the process owner can enter it in advance. For these events, the BPM/WFA server does not have to engage the process owner, and the execution of the processes will be faster because of this.
10. Preferably, the process map, business rules and recipients can be changed at anytime on an ad hoc basis. The process owner does not have to wait for an event without rules to be triggered. The process owner can add, delete or change rules at anytime. This enables process owners to change the definition of processes at any time as the business conditions of the company and its environment changes.

The BPM/WFA system shown in FIG. 2 has the following components and capabilities. The event-driven BPM/WFA server controls the execution of business processes. The BPM/WFA server responds to the following UnRuly Events:
  a. "Completion of a step"
  b. "Activation of step"
  c. "Step is returned"
  d. "Step is resubmitted"
  e. "Step becomes late"
  f. "Step has no recipient"
  g. "Step is disowned"
  h. Other events that may be added for special situations A "client" software is included on the client computers 44 to enable end users to do their tasks. A new feature in the "client" software from known systems like the Ultimus Workflow Suite gives users the capability to "disown" an incident or case. "Disown" means that the user at the client believes that the step does not belong to them, or that someone else is responsible or better capable of doing it. Disowning a step triggers an event that also causes the BPM/WFA server to invoke the Process Owner Client (described below) to resolve the UnRuly Event.

An "administrator" software on the Administrator client 50 enables administration of the server 42, and a "designer" software on designer client 48 enables defining the steps of business process. These are conventional in Ultimus Workflow Suite and can be as implemented there, augmented to accommodate the changes described herein. Those of ordinary skill in the art will be able to do so.

A "rules repository" 54 is a storage medium, such as a hard drive, where rules are saved, typically in a database. A "rules processor" 52 is included and is capable of selecting stored rules appropriate for a the step in a process and for interpreting the rules and specifying actions that must be taken if the rules are true. The BPM/WFA server and the rules processor are connected for the exchange of information. Rules must be one of the following types:
  Event Rules: Rules that are specific a particular event for a step.
  Process Rules: Rules that are specific to the entire process and can be used at any step or event of the process.
  Global Rules: Rules that are common to the whole BFM/WFA system and can be used in any process for any task step or event.

Rules can have different inputs that allow the rules to be based on real-time information that dictates the flow of the process. These inputs could be of the following types:
  Other Event Rules. The result of another Event Rule can be nested in a rule
  Process Rules The result of a Process Rule can be nested in the rule
  Global Rules The result of a Process Rule can be nested in the rule
  Process Variables Process variables carry information captured by the process. These variables can be used as inputs to the rules.
  Status of Steps: The status of another step (whether the step is active, completed, late, or inactive) can be used as inputs to the rules.
  Constants: Constants can be used as inputs to the rules.
  Custom: The result of computing a custom, user-defined function can be used as input to the rules.

Rules are associated with Actions, which are taken when a rule evaluates True. "Actions" typically include at least the following:
  Activate a Step: This forces another step in the process to be activated
  Evaluate a Step: This causes another step in the process to be evaluated. If the Activate rules of the target step are true, then the target step is activated. Otherwise no action takes place.
  Abort a Step: This forces another step in the process to be aborted if it is currently active.
  Abort Incident This aborts the case or incident of the process.
  Set Recipient of Step: This causes the recipient of the step to be established.
  Custom Action This causes a custom action to be taken as defined by a custom program.

The preferred embodiment of the present invention also includes a novel type of client software referred to as a "Process Owner Client" that is loaded on the client computers 44, 46, 48. A client becomes a process owner for a process by a designation made for the process. The Process Owner Client enables a process owner to perform some or all of the following functions:

i. View a list of Unruly Events. An Unruly Event is an event for which there are no true rules and/or no links needed to complete a task step.
ii. View a graphic representation of an incident associated with an Unruly Event in order to determine its status.
iii. View an audit trail of an incident associated with an Unruly Event to determine where in the process the Unruly Event developed.
iv. View a message explaining why an Unruly Event was triggered.
v. View an electronic form for an incident to find relevant information.
vi. View a list of variables collected by the process and their current values.
vii. View the business rules, inputs and actions for any step of the process associated with an Unruly Event, preferably graphically.
viii. View an "audit trail" of the incident prior to the occurrence of the UnRuly Event to determine the sequence of events that led to the UnRuly Event
ix. Set or change the rule(s) for Unruly Events.
x. Set or change in input(s) for the rule(s) for any Unruly Events.
xi. Set or change action(s) associated with the rule(s) for any Unruly Events.
xii. Enter or edit a description of a rule.
xiii. Submit an Unruly Event for re-evaluation.
xiv. View the events, inputs and actions of all the rules for all processes for which a process owner has access rights.
xv. Enter or edit any events, inputs and actions of any rule for any processes for which a process owner has access rights.
xvi. View the events, inputs and actions of any process level or global rules for which a process owner has access rights.
xvii. Enter or edit the events, inputs and actions of any process level or global rules for which the process owner has access rights.

The last four functions are provided to enable the process owner to create, modify or delete rules for any event on an ad hoc basis. Therefore, even though there is no need to define any rules upfront, the process owner can use the Process Owner Client at anytime to enter, modify or delete rules based upon external considerations. Thus the present invention provides the flexibility to change business processes at anytime.

FIG. 5 shows a DVD or CDROM usable as electronic storage media containing the data and computer instructions needed to implement the invention. However, it is important to note that the data and computer instructions needed to implement the present invention could also be distributed over the Internet or by any other suitable medium.

As used herein, the phrase "network of computers" means a network that has one or more computers in it, but may also include other user-interface devices such as email-equipped personal digital assistants, cellular phones or other devices now known or later devised that permit a human participant in a business process to interact with the network. The network need not be hardwired, but could include wireless connections or other forms of data communication including RFID readers, infrared scanners or the like. Portions of the network may gather data from ambient on non-network conditions, such as reading temperatures as data inputs useful for process rule evaluation. Other portions of the network may act on non-network facilities, such as selectively discharging goods from a conveyor.

Also, although the preferred embodiments are described as using a server computer, in a distributed processing environment, various functions here attributed to the server, rules processor and rules repository could be performed on various processors. Such an implementation is deemed to be a server implementation for the purposes of this patent and application.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A workflow automation system comprising
a network of computers equipped with workflow automation software to permit a business process to proceed across at least portions of the network based upon rules stored in the network,
wherein the software permits a business process owner to refine the rules for a business process as the business process proceeds and
which includes a business process owner's client software that enables the business process owner to perform the following functions:
  a. View an UnRuly Event for which there are no rules and no links,
  b. View a reason and an audit trail why the UnRuly Event was triggered,
  c. View variables collected by the process and their current values,
  d. View the rules, inputs and actions for an step of the business process associated with the UnRuly Event,
  e. Set or change a rule for the UnRuly Event,
  f. Set or change an input for a rule for the UnRuly Event,
  g. Set or change an action associated with the rule for the UnRuly Event,
  h. Enter or edit a description of the rule,
  i. Submit the UnRuly Event for re-evaluation,
  j. View a business process map of an incident associated with an UnRuly Event to graphically determine the incident's status,
  k. View an audit trail of the incident associate with the UnRuly Event to determine where the incident is in a business process,
  l. View an electronic form for the incident to find relevant information,
  m. View the events, inputs and actions of all the rules for all business processes for which the business process owner has access rights,
  n. Enter or edit the events, inputs and actions of all the rules for all business processes for which the business process owner has access rights,
  o. View the events, inputs and actions of all the process level or global rules for which the business process owner has access rights, and
  p. Enter or edit the events, inputs and actions of all the business process level or global rules for which the business process owner has access rights.

* * * * *